UNITED STATES PATENT OFFICE.

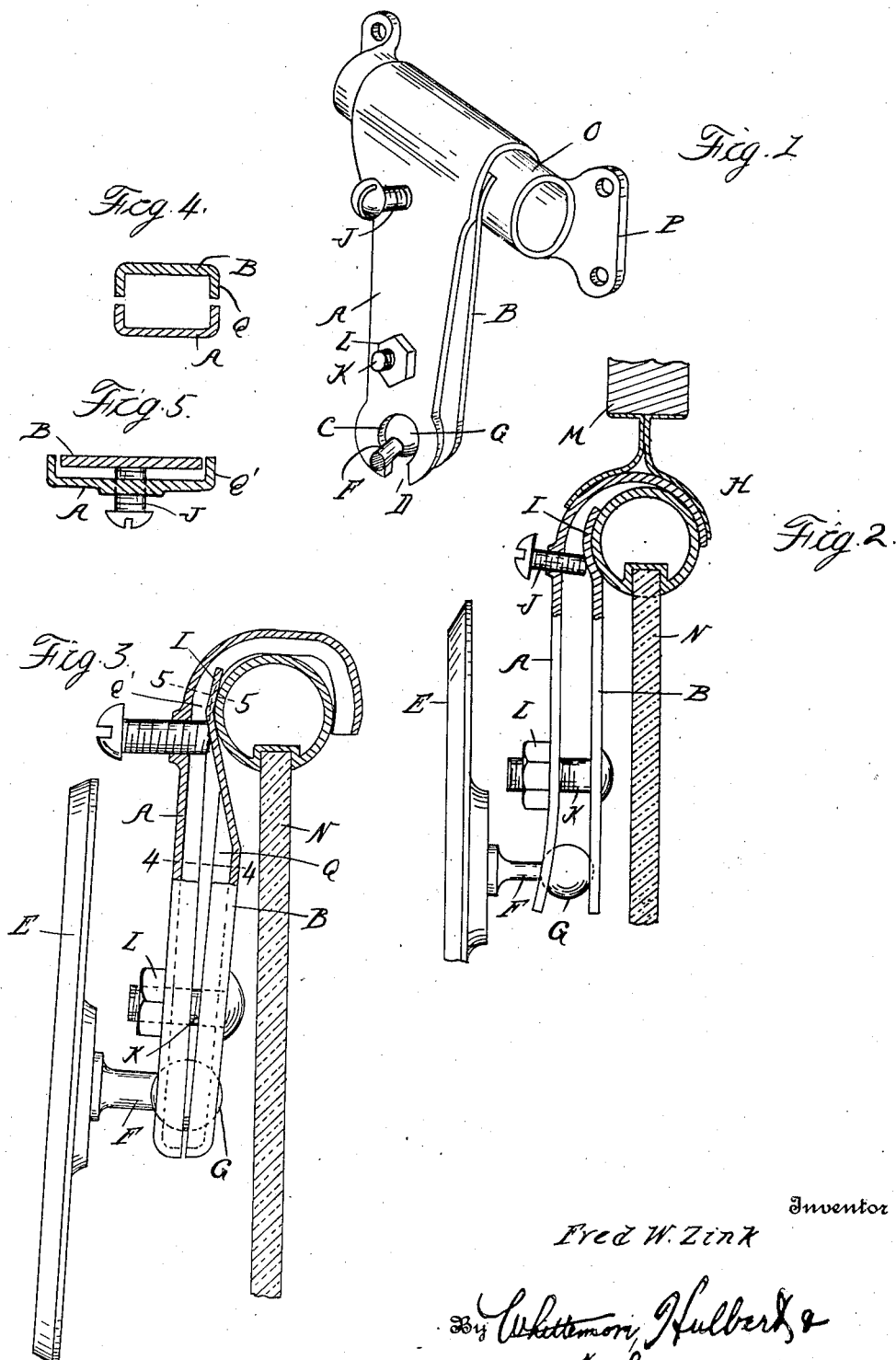

FRED W. ZINK, OF DETROIT, MICHIGAN, ASSIGNOR TO KALES STAMPING COMPANY, OF DETROIT, MICHIGAN, A CORPORATION OF MICHIGAN.

MIRROR-SUPPORT.

1,359,645.     Specification of Letters Patent.     Patented Nov. 23, 1920.

Application filed November 6, 1919. Serial No. 336,071.

*To all whom it may concern:*

Be it known that I, FRED W. ZINK, a citizen of the United States of America, residing at Detroit, in the county of Wayne and State of Michigan, have invented certain new and useful Improvements in Mirror-Supports, of which the following is a specification, reference being had therein to the accompanying drawings.

The invention relates to adjustable mirrors such as are used on automobiles and other vehicles, and it is the object of the invention to obtain a simple construction of adjustable bracket which may be used in various locations and secured to different members. To this end the invention consists in the construction as hereinafter set forth.

In the drawings:

Figure 1 is a perspective view of the bracket;

Fig. 2 is a sectional side elevation thereof showing the same in engagement with the top bar of a wind shield;

Fig. 3 is a section similar to Fig. 2, showing a modified construction;

Figs. 4 and 5 are cross-sections respectively on lines 4—4 and 5—5 of Fig. 3.

In the present state of the art rear vision mirrors are used in various locations upon automobiles and other vehicles. Usually with open body cars the mirror is located at one side and projects outward beyond the body. On the other hand, with closed cars it is necessary to place the mirror inside and to obtain the vision through the rear window. With the open cars the mirror is usually supported by a bracket arm clamped upon the side rail of the windshield, or other convenient support, but with the closed cars, or where curtains are used on the open cars, such engagement is obstructed. With my improvement the supporting bracket is of such a construction that it can be engaged with the top rail of a windshield as well as the side rail thereof, and may also be conveniently attached in other locations.

In detail, A and B are coöperating members, preferably formed of sheet metal stampings and which are provided at one end with apertures C having end entrance slots D connecting therewith, and E is the mirror which has projecting centrally from its rear side the shank F terminating in a ball G and this ball is adapted to be seated in the circular apertures C of the members A and B and to be frictionally clamped between said members. At their opposite ends the members A and B are provided with means for engaging a support, such as either the side or top rail of a windshield. The member A has the return-bent portion H which is sufficiently open to embrace the rail or other supporting member. The member B is provided with a bearing portion I for engaging the diametrically opposite side of the support for the side and on which the members A and B are located. J is a screw, or other clamping means, for forcing the bearing portions I and H toward each other, said screw being preferably engaged with a threaded aperture in the member A and bearing against the portion I of the member B. There is a second clamping screw or bolt K which passes through the members A and B adjacent to the seats for the ball G and has a nut L. The bolt K also acts as a fulcrum whereby the screw J not only forces the parts I and H toward each other but also causes the apertured or slotted end portions of the members A and B to grip the ball firmly.

With the construction as described the bolts J and K, the members A and B form not only a friction clamp for the ball G, but also a clamp for engaging the supporting member and it will be observed that the latter clamp may be engaged with both of said members A and B on one side of the support. Thus where it is desired to engage the bracket with the top rail of the windshield, the portion H may be hooked over said rail and by then adjusting the screw J, which is on the inside of the shield, the clamping is effected. Where a canopy top is in use, this is usually in close proximity to the top rail of the windshield and is frequently provided with flaps for engaging said rail, as indicated at M, while the glass N of the shield obstructs the other inner side of the rail. This construction does not, however, interfere with the engagement of my improved clamp for the hook H may be inserted between the rail and the flaps M, as indicated in Fig. 2.

Where, as in a car having a closed body, such clamping engagement cannot be effected, an auxiliary rail or support O may be provided, such as shown in Fig. 1, and this may be readily formed of pressed sheet metal and provided with integral securing brackets P.

When the bracket is clamped in the desired location, the mirror E may be adjusted to any angle by the turning of the ball G in the circular bearings C. The necessary friction for holding the mirror in its different adjustments is obtained through the resilient tension of the members A and B produced by the clamping bolts J and K.

In the modified construction shown in Figs. 3, 4, and 5 the members A and B are formed with opposite inwardly-projecting flanges Q which extend into close proximity but with sufficient clearance to permit of adjustment. The flanges upon the member A preferably extend completely around the return-bent portion H, but the flanges upon the member B terminate short of the bearing portion I, while the latter extends between the flanges on the member A, as indicated at Q'. This modified construction conceals the bolt K and has a more pleasing appearance than the construction shown in Figs. 1 and 2.

What I claim as my invention is:

1. The combination with a mirror having a shank with an enlarged spherical portion, of a supporting bracket consisting of a pair of members adapted to receive and grip the spherical portion of the shank between adjacent end portions when the latter are forced toward each other and to engage a support with the other end portions when the latter are forced in the opposite direction and connecting means between the members for operating the latter to simultaneously engage the shank and the support.

2. The combination with a mirror having a shank with an enlarged spherical portion, of a supporting bracket consisting of a pair of members adapted to receive and grip the spherical portion of the shank between adjacent end portions when the latter are forced toward each other and to engage a support with the other end portions when the latter are forced in the opposite direction, connecting means between the members forming a fulcrum on which they rock and means operating the members on the fulcrum to simultaneously engage the shank and the support.

3. The combination with a mirror having a shank with an enlarged spherical portion, of a supporting bracket consisting of a pair of members having slotted and apertured end portions adapted to receive and grip the spherical portion of the shank between them, the other end portions of the members being adapted to coöperatively clamp a support between the outer face of one member and an adjacent portion of the other member when the adjacent end portions of the members are forced apart, and connecting means between the members for operating the end portions to simultaneously engage the shank and the support.

4. The combination with a mirror having a shank with an enlarged spherical portion, of a supporting bracket consisting of a pair of members adapted to receive and grip the spherical portions of the shank between adjacent end portions when the latter are forced toward each other and to engage the support with the other end portions when the latter are forced in the opposite direction, a fulcrum bolt articulating the members between the end portions thereof, and tension means adapted to rock the members on the fulcrum to simultaneously engage the shank and the support.

5. The combination with a mirror having a shank with an enlarged spherical portion, of a bracket consisting of a pair of members provided with slotted circular apertures near one end for receiving and gripping the spherical portion of the shank between them, one of the members having a bearing portion for engaging a supporting member and the other having a hooked portion coöperating with the bearing portion to grip a supporting member between them, a fulcrum bolt connecting the members between the end portions thereof and a tension screw passing through one of the members and abutting the other member for forcing the bearing portion and hooked portion toward each other and simultaneously therewith for causing the apertured portions to grip the shank.

6. The combination with a mirror having a shank with an enlarged spherical portion, of a supporting bracket consisting of a pair of members loosely articulated between the ends thereof by a fulcrum bolt and adapted to receive and grip the spherical portion of the shank between adjacent end portions of the members when such portions are forced toward each other and to engage a support with the other end portions when the latter are forced in the opposite direction and a tension screw engaging the members and operating the latter to simultaneously engage the shank and the support.

7. The combination with a mirror having a shank with an enlarged spherical portion, of a supporting bracket consisting of a pair of spaced members adapted to receive and grip the spherical portion of the shank between adjacent end portions when the latter are forced toward each other and to engage a support with the other end portions when the latter are forced in the opposite direction, connecting means between the members for operating the members to simultaneously engage the shank and the support and marginal flanges on the members for sealing the space between them.

In testimony whereof I affix my signature.

F. W. ZINK.